Dec. 16, 1930.  S. G. REINHARD  1,785,459
CONNECTING ROD BEARING
Filed March 8, 1928

INVENTOR.
S. G. Reinhard
BY

ATTORNEY.

Patented Dec. 16, 1930

1,785,459

UNITED STATES PATENT OFFICE

SILAS G. REINHARD, OF TOLEDO, IOWA

CONNECTING-ROD BEARING

Application filed March 8, 1928. Serial No. 260,024.

The object of the invention is to improve the construction of the bearing of a connecting rod on the crank pin of an engine crank shaft, so that the frequent adjustment, now generally necessary to compensate for wear, will be eliminated; to provide a bearing between the connecting rod and crank shaft which will be free running and not likely to bind; and to provide a ball bearing for the crank pin of a crank shaft which may be mounted on the shaft after the latter has been completed and without the necessity for the shaft having to be made in separate parts assemblable to effect completion.

Figure 1:
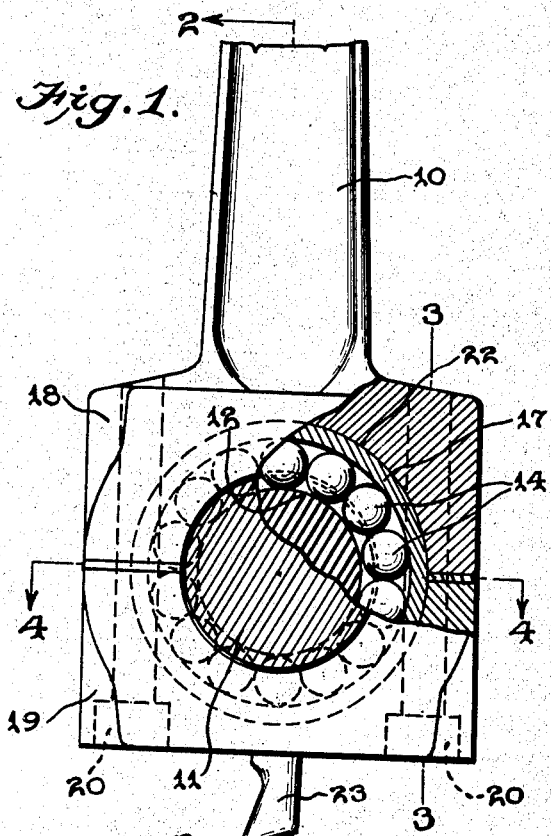

With this object in view, the invention consists in a construction and combination of parts of which a preferred embodiment is illustrated in the accompanying drawings, wherein:

Figure 1 is a view partly in elevation and partly in section of a portion of a crank shaft equipped with the improved connecting rod bearing.

Figure 3:
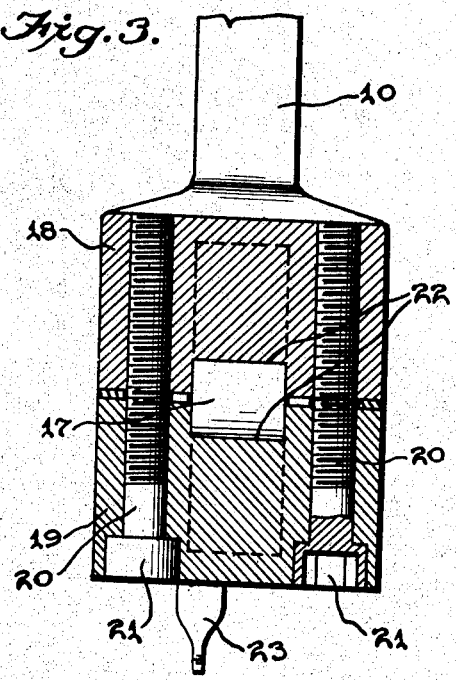
Figure 2:
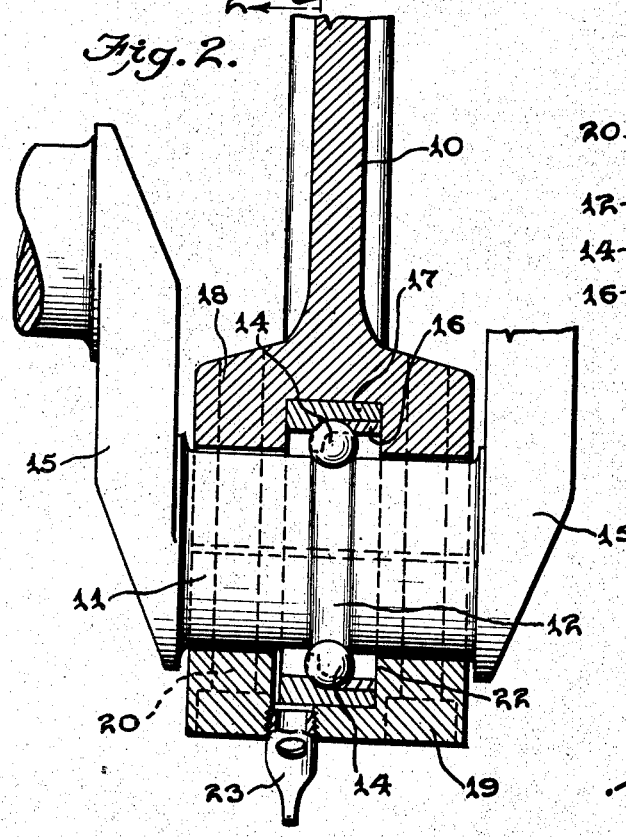
Figure 4:
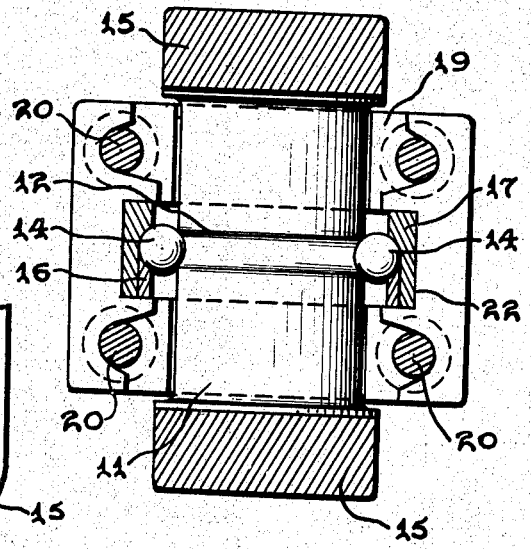
Figure 4:

Figures 2, 3 and 4 are respectively sectional views on the planes indicated by the lines 2—2, 3—3 and 4—4 of Figure 1.

The invention is applied to a crank shaft 10 constructed in accordance with the usual practice with the exception that the crank pin 11 is peripherally grooved as indicated at 12 for the reception of the balls 14. The crank pins 11 and cranks 15 of the shaft are integrally connected and the retainer 16 which constitutes an element of the ball bearing, is slipped around over the crank on to the pin 11 by which it is to be carried and the balls 14 then set in the groove 12 under the retainer and all having been positioned, the race ring 17 is forced over the balls into enclosing relation with the retainer, the race ring being brought to its proper position on the crank pin by sliding it around the crank portions of the shaft.

In order that adequate resistance to wear may be had, the crank pins in the region of the grooves 12 are case-hardened, so that the balls, while turning freely, may not subject the crank pins to undue wear.

The connecting rod 18 also follows the usual practice with the exception that the cap portion 19 is detachably secured to it by means of four clamping screws 20 positioned at the corners of the cap rather than two positioned on opposite sides at the center. It is preferable to employ clamping screws with socketed heads such as indicated at 21 so that they may be screwed up or released by means of a pin wrench. The cap and connected portion of the connecting rod constitute the bearing element of the latter and the two are internally grooved as indicated at 22 to receive the ball bearing mounted on the crank pin. In the assembling operation, the cap 19 is screwed down tight against the ball bearing race ring and by reason of the ball bearing, a free running connection is then had between the connecting rod and the crank pin, the ball bearing receiving oil from the crank case by means of an oil tube 23 mounted in the bottom of the cap portion so as to be in communication with the ball bearing receiving groove of the connecting rod.

The invention having been described, what is claimed as new and useful is:

In combination with a crank shaft and connecting rod, a ball bearing having balls running in a groove formed directly upon the crank pin of the crank shaft and a race ring in surrounding relation to said balls, the connecting rod having a head portion in surrounding relation to said race ring, the head portion of the connecting rod being provided with a removable cap, the ball bearing being provided with a retainer enclosed by said race ring and said retainer and race ring having interior diameters sufficient to permit the two being slipped around the crank on to the crank pin in the mounting of the ball bearing.

In testimony whereof he affixes his signature.

SILAS G. REINHARD.